Oct. 29, 1940.  C. JENSEN  2,219,926
CAR UNLOADER
Filed Dec. 27, 1938  5 Sheets-Sheet 1

INVENTOR
CHRISTIAN JENSEN
BY
ATTORNEY

Oct. 29, 1940. C. JENSEN 2,219,926
CAR UNLOADER
Filed Dec. 27, 1938 5 Sheets-Sheet 3

INVENTOR
CHRISTIAN JENSEN
BY Paul, Paul Moore Giers
ATTORNEYS

Oct. 29, 1940.    C. JENSEN    2,219,926
CAR UNLOADER
Filed Dec. 27, 1938    5 Sheets-Sheet 4

INVENTOR
CHRISTIAN JENSEN
BY Paul, Paul Moore Keing
ATTORNEYS

Patented Oct. 29, 1940

2,219,926

UNITED STATES PATENT OFFICE 2,219,926

CAR UNLOADER

Christian Jensen, Minneapolis, Minn., assignor to Cargill, Incorporated, Minneapolis, Minn., a corporation of Delaware Application December 27, 1938, Serial No. 247,890

8 Claims. (Cl. 214—44)

This invention relates to new and useful improvements in car unloaders, and more particularly to such an apparatus adapted for unloading grain and other bulk material from railroad cars.

Numerous attempts have heretofore been made in an endeavor to develop an apparatus for unloading bulk grain from box cars, which would be practical and efficient in operation and whereby substantially all of the grain could be removed from the car without manual labor. To the best of my knowledge, none of the apparatus heretofore developed for this purpose have proven commercially practical. I believe it is safe to say that the reason these machines did not meet with success, was because they were complicated to handle and operate, and were not capable of removing all of the grain from the car. I am familiar with most present day apparatus for unloading cars, and the objections raised to their use. Unless an apparatus for unloading cars is simple to operate and economical in operation, and is so designed that by its use, substantially all of the grain in a car may readily and expeditiously be removed therefrom without manual labor, it will not meet with success.

The car-unloading apparatus herein disclosed is the result of a great deal of research and experimental work in an endeavor to provide such an apparatus in which all of the objectionable features hereinbefore mentioned have been eliminated. The present structure offers all that is desirable in such an apparatus as, for example, it may be operated by a single operator; is efficient and economical in operation; is capable of removing substantially all of the grain from the car; its conveying means may be folded into a compact structure to permit easy passage through a car door; and it is comparatively simple and inexpensive in construction, whereby it may be manufactured at small cost.

An object of the invention therefore, is to provide an apparatus for removing bulk material from grain cars, particularly of the closed type, comprising a main conveyer and a plurality of articulated side or wing conveyers, having means whereby they may readily be extended into the ends of the car, whereby substantially all of the grain may be conveyed towards the center of the car, from whence it is discharged through the open door thereof by the main conveyer, into a suitable pit or receiving means.

A further object is to provide a car unloader comprising a main supporting frame adapted to support the car unloader adjacent to a railroad track, said supporting structure having means for raising or lowering the car unloading apparatus, thereby to aline it with the level of the car floor, whereby the unloading apparatus may readily be moved into or out of the car.

A further object is to provide a car unloader comprising a main conveyer disposed transversely to the longitudinal axis of the car, and a plurality of side or wing conveyers disposed transversely to said main conveyer and having means for extending them into the ends of the car, whereby all of the grain may be conveyed therefrom to said main conveyer which, in turn, discharges the grain from the car into the usual pit.

A further object is to provide an apparatus of the class described comprising a wheeled frame having a plurality of conveyer sections mounted thereon and operatively associated with one another, whereby when the apparatus is moved into a car, said conveyer sections may be extended into the ends of the car, so as to remove all of the grain therefrom and discharge it from the car through its open door, and an operator's station being located exteriorly of the car, whereby a single operator may conveniently control the operation of the entire apparatus.

Other objects of the invention reside in the novel construction of the apparatus, whereby the transversely disposed side or wing conveyer may readily be extended to the ends of the car to remove substantially all of the grain therefrom; in the pivotal construction of the wing conveyers whereby they may be folded into nested position on the main frame of the apparatus, thereby to permit the entire apparatus to readily pass through the open door of a box car; in the means provided for supporting the unloading apparatus, whereby it does not require anchoring to a building, and whereby the entire apparatus is self-contained, and may readily be moved about from place to place; in the unique construction of the side or wing conveyers which convey the grain from the ends of the car to the main conveyer, said wing conveyers being made sectional or articulated, whereby they may be folded upon themselves, when initially started, and when the car is substantially full of grain, said articulated side conveyers being so constructed that they may readily be unfolded and extended into the ends of the car, while in operation; in the simple and inexpensive construction of the entire apparatus; and in the arrangement of the control means whereby a single operator may readily control the operation of the entire apparatus, when unloading the contents of a car.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

*Supporting structures*

The novel apparatus herein disclosed is shown comprising a main supporting structure upon which the conveying mechanism is supported, when the conveying mechanism is not in use. This supporting structure is preferably located adjacent to a railroad track upon which the car to be unloaded is positioned in the usual manner.

Figure 3:
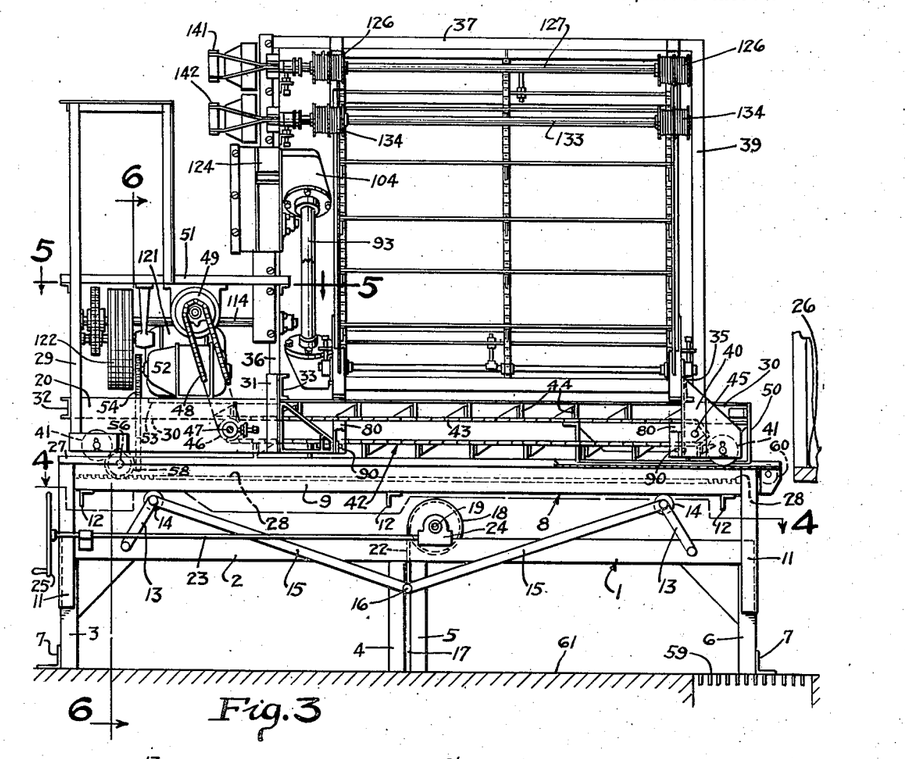
Figure 3 is a side view of the apparatus showing it in its normal inoperative position on the supporting frame, upon which it is supported when not in use.

The supporting structure, generally indicated by the numeral 1, is shown comprising a pair of longitudinal frame members 2 supported upon suitable legs 3, 4, 5, and 6. The end legs 3 and 6 are secured together by cross members 7 adapted to be supported upon a suitable foundation, as best illustrated in Figure 3.

Figure 4:
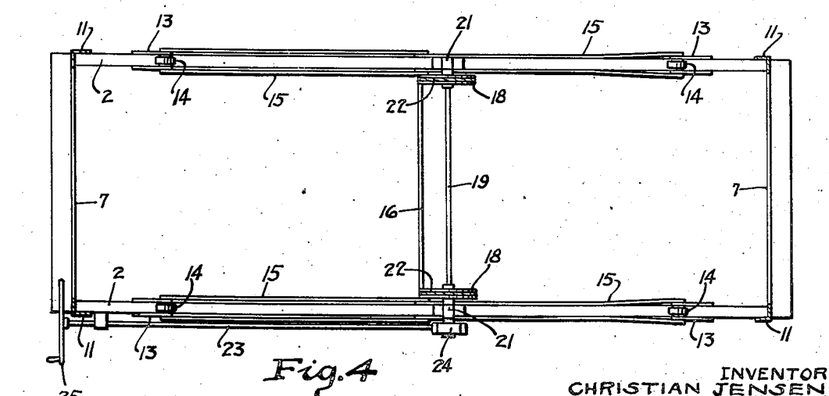
Figure 4 is a sectional plan view on the line 4—4 of Figure 3, showing only the lower portion of the supporting frame.

The conveying mechanism, subsequently to be described, is supported upon an auxiliary frame, generally indicated by the numeral 8. This auxiliary frame comprises longitudinal frame members 9 mounted for vertical adjustment on the supporting structure 1. Suitable means, such as depending members 11, are provided on the auxiliary frame 8 for slidably engaging the four corners of the supporting structure 1, as clearly illustrated in Figures 3 and 4, thereby to guide the auxiliary frame in its vertical movement. The side members 9 of the auxiliary frame 8 are secured together in spaced relation by suitable cross members 12.

The means provided for vertically translating the auxiliary frame 8 with respect to the supporting frame 1, is shown comprising a plurality of arms 13, pivoted to the longitudinal frame members 2 of the supporting structure and carrying rollers 14 at their outer ends. These rollers are adapted to engage the lower edges of the side members 9 of the auxiliary frame 8, whereby the auxiliary frame is supported upon said arms. Connecting links 15 have their upper ends pivotally connected to the upper ends of the arms 13. The lower ends of said links are connected to a cross shaft 16 mounted for vertical movement in a gap 17 provided between the legs 4 and 5 of the supporting structure 1.

Drums or sheaves 18 are secured to a shaft 19 mounted in suitable bearings 21 secured to the side frame members 2 of the supporting structure. A cable 22 is wound about each drum or sheave 18. One end of each cable 22 is secured to its respective drum 18 and the opposite ends of the cables are suitably secured to the cross shaft 16, whereby the shaft is retained in its adjusted position by the cables 22.

Means is provided for rotating the shaft 19 to vertically adjust the auxiliary frame 8. The means provided for thus vertically translating the shaft 19, is shown comprising a longitudinally extending shaft 23 having a worm and gear drive connection with the shaft 19, as indicated at 24 in Figures 3 and 4. A suitable hand wheel 25 is secured to the outer end of the shaft 23, whereby the shaft 19 may be conveniently rotated by rotation of the wheel 25. If desired, other means may be provided for vertically adjusting the auxiliary frame 8 on the supporting structure 1, without departing from the scope of the invention.

From the foregoing, it will be noted that the auxiliary frame 8 may readily be vertically adjusted upon the supporting frame 1, by manipulation of the hand wheel 25, whereby the top of the auxiliary frame 8 may be suitably alined with the floor of the box car, partially shown at 26 in Figure 3. Suitable tracks 27 are shown secured to the upper portions of the side frame members 9 of the auxiliary frame 8, and longitudinally extending rack bars 28 are also provided on the auxiliary frame 8, for purposes subsequently to be described.

*Conveyer supporting frame*

The conveying mechanism comprises a frame including side plates 20 having their ends secured to upright posts 29 and 31. A cross member 32 is interposed between the posts 29 of the side plates 20 to tie them together at their lower ends. A cross member 33 is also interposed between the posts 31 and cooperates with the cross member 32 to retain the side plates 26 in spaced parallel relation.

A longitudinal frame member 30 has one end portion secured to the cross members 32 and 33. The opposite end of this member is secured to a cross member 35 having its ends portion extending laterally from the longitudinal member 30 in a manner similar to the cross member 33. The frame member 30 is shown I-shaped in cross section, and may consist of a pair of channels placed back to back. It extends the full length of the apparatus and may be termed the back bone thereof.

An upright frame is supported on the longitudinally extending frame member 30, to support the driving means for the conveying mechanism. This upright frame is shown comprising a pair of channel-shaped posts 36 and 39, having their lower ends secured to the frame member 30. The upper ends of the posts 36 and 39 are secured together by a horizontal member 37, whereby a rectangular frame is provided. The posts 36 and 39 are suitably braced to the cross members 33 and 35, respectively, to provide a rigid frame structure.

Figure 6:
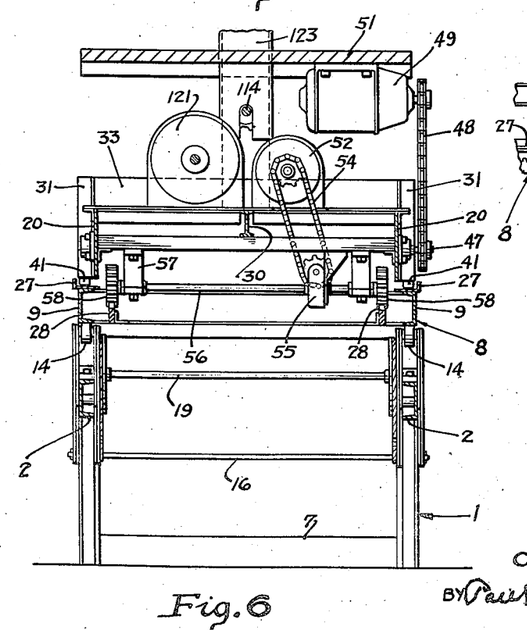
Figure 6 is a sectional view on the line 6—6 of Figure 3, showing the pinions on the unloader frame engageable with racks on the stationary frame, thereby to propel the unloader into and out of the car.

Suitable brackets 34 and 40 are secured to the ends of the cross members 33 and 35, as best illustrated in Figure 3. The entire apparatus is mounted for traveling movement upon suitable carrying wheels or rollers 41 provided at the ends thereof, and which wheels roll on the tracks 27, shown in Figure 6.

Figure 7:
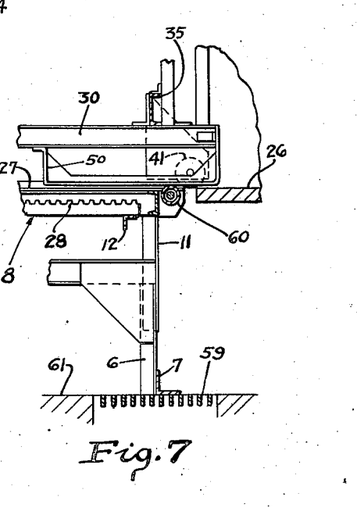
Figure 7 is a detail sectional view showing one end of the supporting frame.

To facilitate guiding the conveyer supporting frame into the car, a shoe 50 is secured to the longitudinally extending beam 30 of the frame adapted to engage a roller 60 mounted in suitable brackets secured to the end of the auxiliary frame 8. The shoe 50 engages the roller 60 before the carrying wheels 41 disengage the tracks 27, whereby the gap between the end of the auxiliary frame and the floor 26 of the car is bridged by the shoe 50 until the carrying wheels 41 engage the floor of the car, as best shown in Figure 7.

*Main conveyer*

A main conveyer, generally indicated by the numeral 42, is shown comprising a pair of chains 43 having flights 44 secured thereto, the lower edges of which are adapted to substantially engage the floor of the car, as will be understood by reference to Figure 3. The chains 43 are supported at one end of the structure upon suitable sprockets secured to a shaft 45, and at their opposite ends by suitable sprockets 46 secured to a shaft 47. The shaft 47 is driven by a chain drive 48 from a motor 49 shown suspended from a platform 51 which provides the operator's station.

A motor 52 is shown mounted upon a suitable platform 53 provided between the side plates 20. The motor 52 has a chain drive 54 operatively connecting it to a worm gear mechanism 55 operatively connected to a cross shaft 56 supported in suitable hangers 57. Gear wheels 58 are secured to the shaft 56 and engage the tracks 28, whereby when the motor 52 is operated, the gears 58 are driven and impart traveling movement to the conveyer frame upon the tracks 27 of the auxiliary frame 8.

The frame of the conveying mechanism is open on opposite sides as shown in Figure 3, whereby the main conveyer is exposed so that the grain may be fed thereto from each end of the car. It is also to be understood that the auxiliary frame 8 and supporting structure 1 are open so that the grain discharged from the car by the main conveyer 42 may freely pass therethrough and into the usual grate 59, provided in the floor 61. The grate 59 is of conventional construction, and is located over a suitable grain bin or other receiving means, not shown.

*Wing conveyers*

Figures 2, 11, 12, 13:
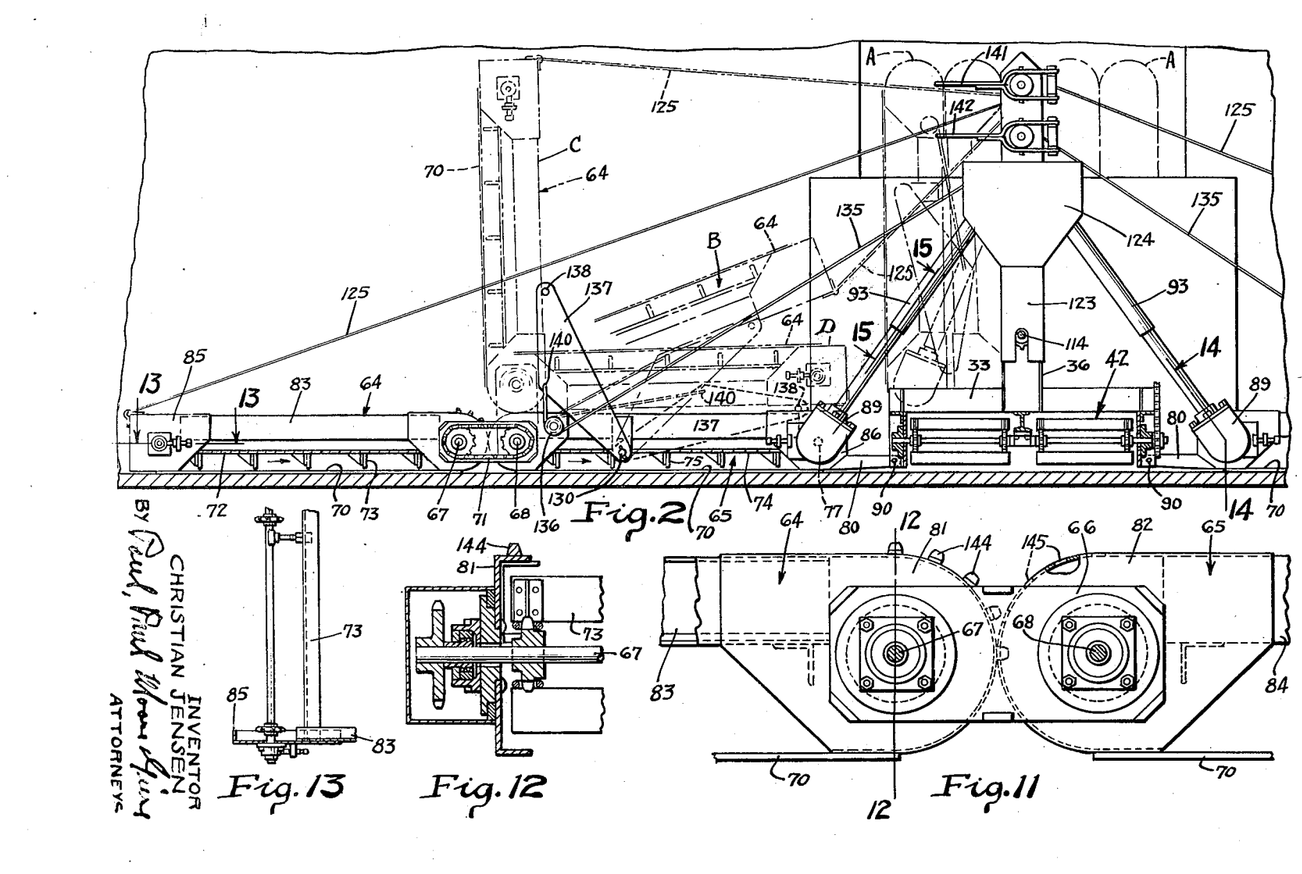
Figure 2 is a sectional view substantially on the line 2—2 of Figure 1, showing in full and dotted lines, various positions of the side or wing conveyers.
Figure 11 is an enlarged detail sectional view substantially on the line 11—11 of Figure 1, showing the inter-locking engagement between the adjacent ends of the wing conveyers.
Figure 12 is a detail sectional view on the line 12—12 of Figure 11.
Figure 13 is a detail sectional view on the line 13—13 of Figure 2.

One of the features of the invention resides in the means provided for feeding the grain from the ends of the car towards the main conveyer 42. The means provided for thus feeding the grain to the main conveyer, comprises oppositely disposed wing conveyers, generally indicated by the numerals 62 and 63. Each wing conveyer comprises two sections 64 and 65, pivotally connected together by link elements 66, as best shown in Figure 11. These links maintain the shafts 67 and 68 of each pair of conveyer sections 64 and 65 in proper spaced relation. The shafts 67 and 68 are connected together for simultaneous operation by a chain drive 71, as shown in Figure 2, whereby it is essential that the spacing between the shafts 67 and 68 be maintained substantially constant.

Figures 1, 14, 15:
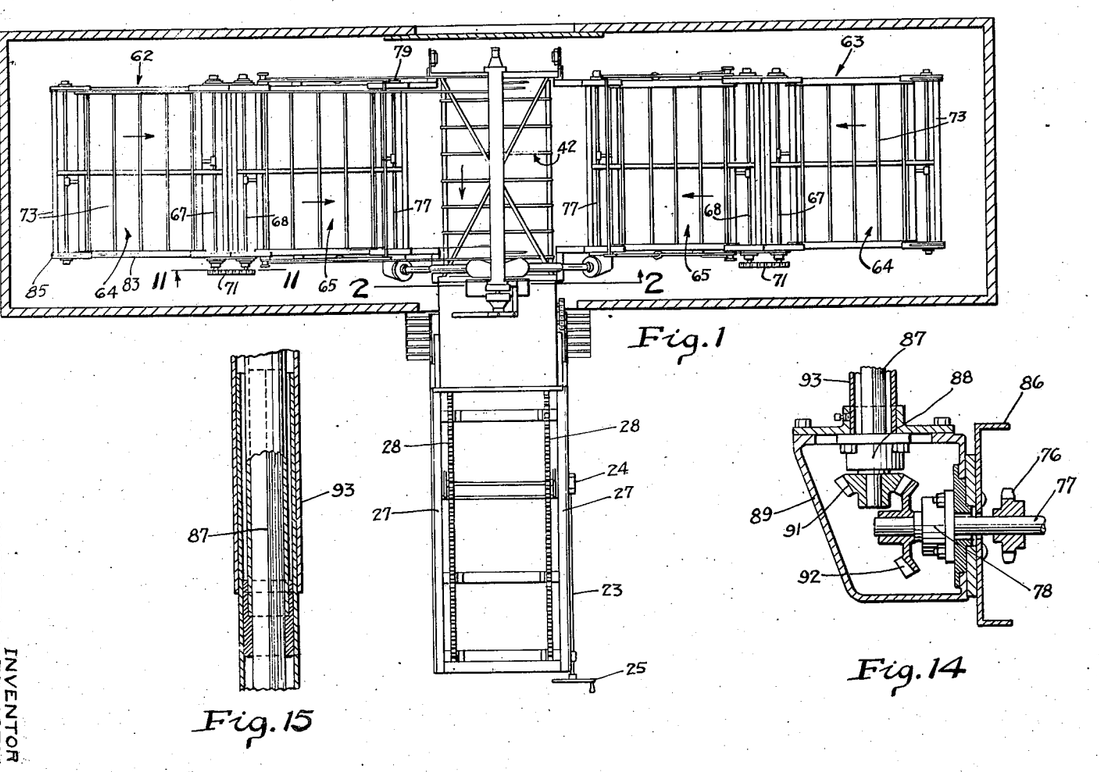
Figure 1 shows a sectional plan view of a box car with the car unloader positioned therein.
Figure 14 is a detail sectional view on the line 14—14 of Figure 2, showing one of the bevel gear drives provided for the wing conveyers.
Figure 15 is a detail sectional view on the line 15—15 of Figure 2, on an enlarged scale, showing a portion of one of the telescopic shafts for driving the wing conveyers.

Each outer conveyer section 64 comprises a chain 72 mounted on suitable sprockets provided at the ends of the section. The chains 72 have flights 73 secured thereto adapted to substantially engage the floor of the car when the sections 64 are in their horizontal positions, as shown in full lines in Figure 2, thereby to drag or convey the grain from the ends of the car to the main conveyer 42. The inner conveyer sections 65 are provided with similar conveyer chains 74 having flights 75 thereon. The conveyer chains 74 of the inner sections 65 are supported at the outer ends of said sections by suitable sprockets secured to the shafts 68, and at their inner ends by suitable sprockets 76, secured to shafts 77 mounted in suitable bearings 78 and 79, as shown in Figures 1 and 14. Guide bars 70 are secured to the bottoms of the frames of the conveyer sections 64 and 65, to guide the lower edges of the flights 73 over the surface of the floor to prevent them from engaging protruding nail heads or other obstructions fixed to the surface of the floor. The guide bars 70 are of small dimension vertically, so that the flights may remove substantially all of the grain from the car floor. The bars 70, in addition to preventing the flights from engaging protruding obstructions in the floor, also provide smooth surfaces for the flights to slide on, thereby minimizing friction and relieving the floor of wear from the flights.

As best shown in Figures 11 and 12, the adjacent ends of the conveyer sections 64 and 65 are provided with guards 81 and 82, respectively. These guards are secured to side members 83 and 84 of the conveyer sections. Guards, generally indicated by the numeral 85, are also provided at the outer ends of the conveyer sections 64, and are secured to the side members 83 of said sections. The members 83 serve to retain the shafts of the conveyer chains in spaced relation and to provide a more or less rigid structure. Guards 86 are provided at the inner ends of the inner conveyer sections 65, and are suitably secured to the longitudinal members 84 thereof. The inner ends of the wing conveyer sections 65 are provided on their opposite sides with longitudinally extending arms 80, the inner ends of which are pivotally connected to the brackets 34 and 40, as shown at 90 in Figures 2 and 3. The arms 80 permit the wing conveyers to be swung into vertical positions over the outer portions of the conveyer frame, as indicated in the dotted lines A in Figure 2.

Drive for wing conveyers

The means for driving the wing conveyers is best shown in Figures 2, 8, 9, and 10, and comprises telescoping shafts 87, having their lower ends rotatably supported in bearings 88 provided in suitable housings 89, pivotally secured to the inner guards 86 of the inner conveyer sections 65. Pinions 91 are secured to the lower ends of the telescoping shafts 87 and mesh with bevel pinions 92 secured to the shafts 77 of the inner conveyer sections, whereby when the telescoping shafts 87 are rotated, the inner conveyer sections 65 are operated which, in turn, operate the outer conveyer section 64 through the chain drives 71. The telescoping shafts 87 are enclosed within suitable casings or tubular members 93.

Figures 8, 9, 10:
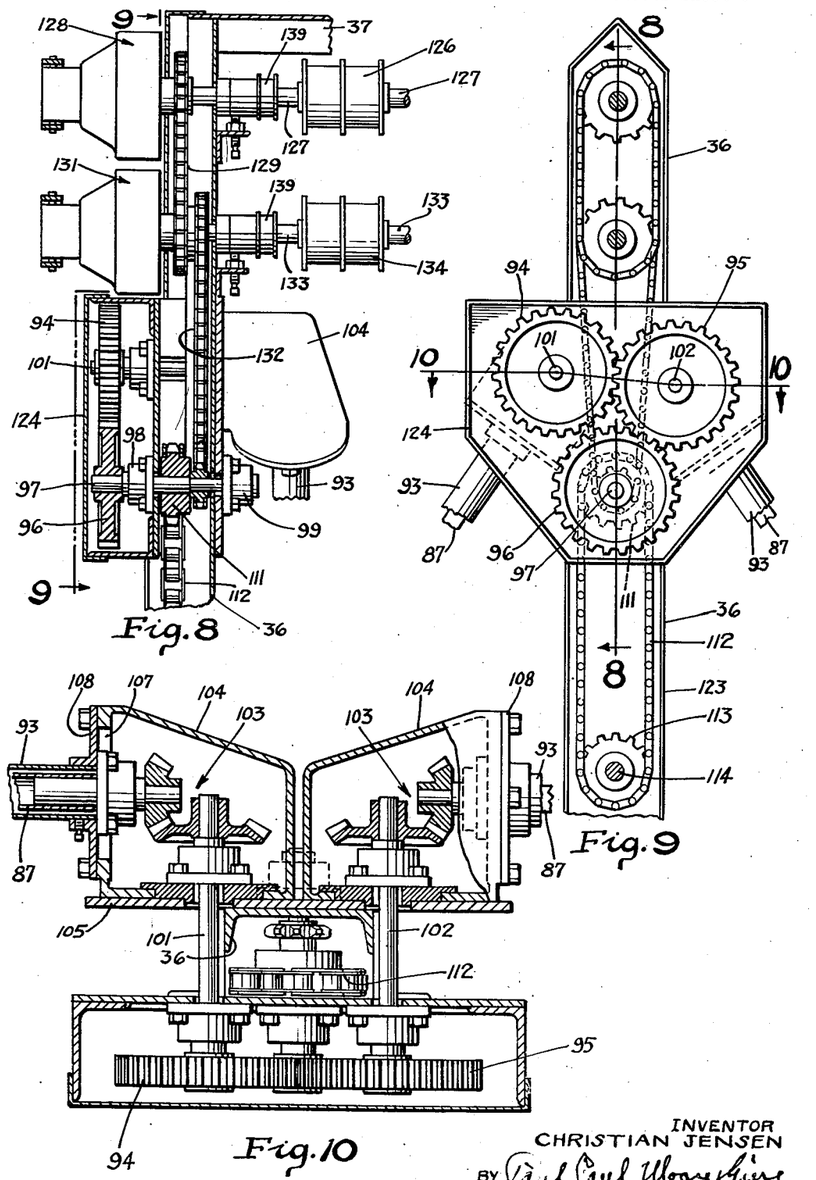
Figure 8 is a vertical view on the line 8—8 of Figure 9, showing the driving connection between the clutches and the driving mechanism for the wing conveyers.
Figure 9 is a detail sectional view on the line 9—9 of Figure 8.
Figure 10 is an enlarged detail sectional view substantially on the line 10—10 of Figure 9, showing the drives for the wing conveyers.

The means for driving the telescoping shafts 87 to operate the wing conveyers is best illustrated in Figures 8, 9, and 10 and comprises a pair of intermeshing gears 94 and 95, driven by a gear 96. The gear 96 is secured to a shaft 97, rotatably mounted in suitable bearings 98 and 99, as best shown in Figure 8. The gears 94 and 95 are secured to shafts 101 and 102, respectively, having bevel gear drives, generally indicated by the numeral 103, operatively connecting them to the telescoping shafts 87, as best shown in Figure 10. The bevel gear drives 103 are enclosed within suitable housing 104, mounted for pivotal movement on a supporting plate 105 secured to the upright channel member 36 of the conveyer supporting frame. Each casing 104 has an opening 107 on one side normally closed by a plate 108 to which the tubular casings 93 of the telescoping shafts 87 are secured.

Figure 5:
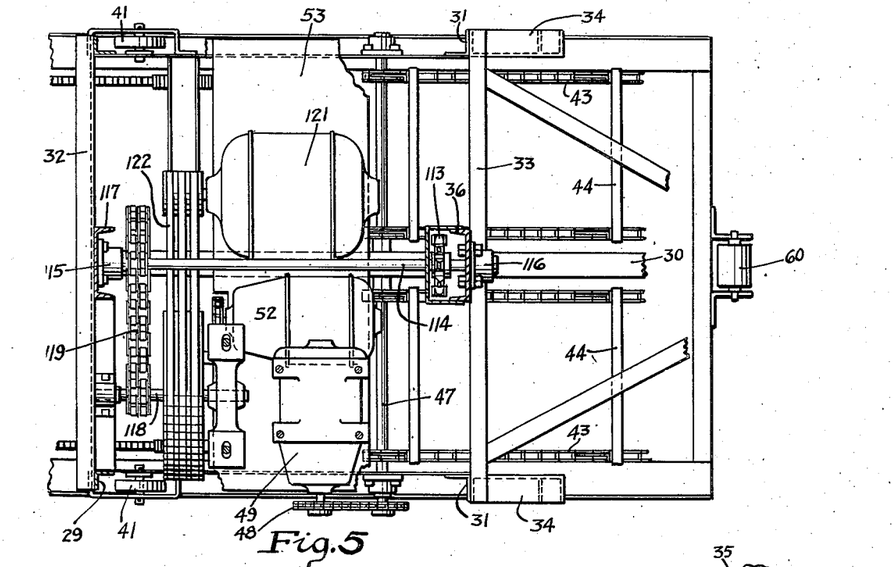
Figure 5 is a sectional plan view on the line 5—5 of Figure 3, on a larger scale, showing the various motors for driving the various mechanisms of the apparatus.

A sprocket 111 is secured to the shaft 97 and has a chain 112 operatively connecting it to a sprocket wheel 113 secured to a shaft 114, shown mounted in bearings 115 and 116 secured to an upright channel member 117 and the member 36, respectively, of the conveyer frame, as shown in Figure 5. The shaft 114 is driven from a counter shaft 118 by a chain drive 119. The counter shaft 118 is driven by a suitable motor 121 through a suitable belt drive 122. The motor 121 is mounted on the platform 53. The chain drive 112 is enclosed within a suitable housing 123, shown provided with a casing 124 at its upper end which encloses the gears 94, 95, and 96. A plurality of suitable controls, not shown, are provided on the operator's platform 51, whereby the operator may conveniently control the operation of the motors 49, 52, and 121 independently of one another, thereby to control the operation of the entire apparatus.

Control means

Means is provided for moving the positions of the wing conveyers with respect to the main conveyer 42, as shown by the full and dotted lines in Figure 2. Each wing conveyer, as hereinbefore stated, comprises two sections 64 and 65, pivotally connected together, whereby the outer sections may be adjusted to any desired angle with respect to their complemental inner sections 65, or they may be folded completely over the inner sections in parallel relation thereto. To thus relatively change the positions of the wing conveyers, each outer conveyer section 64 has the ends of a pair of cables 125 secured to its outer end, at opposite sides thereof, as best illustrated in Figure 2. The opposite ends of these cables are wound about a pair of drums 126, secured to the ends of a shaft 127 having one end connected to the driven member of a suitable clutch, generally indicated by the numeral 128. The driving member of the clutch 128 is driven by a chain drive 129, from the driving member of a similar clutch 131. A chain 132 drives the chain 129 from the shaft 97, as best shown in Figure 8, whereby when the apparatus is in operation, the driving members of the clutches 128 and 131 are constantly driven by the chains 129 and 132.

A driven member of the clutch 131 is secured to a shaft 133, similar to the shaft 127. Drums 134 are secured to the ends of the shaft 133, and have the ends of a pair of cables 135 wound thereabout. The opposite ends of the cables 135 have running connections with sheaves 136, provided at the outer ends of the inner conveyer sections 65, as best illustrated in Figure 2. A plate element 137 is pivotally mounted at 130 on each side of each conveyer section 65. The outer ends of the cables 135 are connected to the intermediate portions of said plate elements, as indicated at 140 in Figure 2. The opposite ends of each pair of plate elements 137 are tied together by suitable bars 138, which are adapted to be engaged by the outer conveyer sections 64, when the latter are folded inwardly to the dotted line positions, indicated at C in Figure 2.

Suitable brake drums 139 are provided on the clutch shafts 127 and 133 having suitable brake bands engaged therewith which may be manually controlled by manipulation of suitable pedals provided on the operator's platform. These brake bands and operating pedals are of ordinary well-known construction and it is therefore thought unnecessary to illustrate the same in the drawings.

The clutches 128 and 131 are provided with suitable operating levers 141 and 142, respectively, arranged adjacent to the operator's platform, as clearly illustrated in Figures 2 and 3, whereby an operator stationed on the platform 51 may conveniently manipulate them to control the operation of the wing conveyers.

One of the important features of the invention resides in the novel manner in which the wing conveyers are mounted with respect to the main conveyer 42, whereby they may be folded into nested relation while in operation, and whereby they may also be extended their full length without interrupting the operation of the apparatus. In Figure 2, it will be noted that the wing conveyers are shown extended their full length, in full lines, in which position, the overall length of the apparatus from tip to tip of the wing conveyer may be substantially equal to the inside length of an average length car, as shown in Figure 1, whereby substantially all of the grain in the car may be removed therefrom without manual labor.

When the apparatus is inoperative, the wing conveyers are folded into upright parallel relation, as shown by the dotted lines A in Figure 2, and in full lines in Figure 3. When the wing conveyers are so positioned, the overall width of the apparatus is less than the width of the car door, whereby the apparatus may readily be moved through the door opening of the car without interference. It is to be understood that the overall height of the apparatus is also such that there is sufficient head clearance over the apparatus when passing through the car door opening.

Operation

In the operation of the apparatus, the usual closure for the car door opening is removed, whereupon a portion of the grain may discharge from the car through the open door and through the grate 59. The operator then vertically adjusts the auxiliary frame 8 by rotation of the hand wheel 25, until the tracks 27 are substantially horizontally alined with the floor 26 of the car, it being understood that the car door is first alined with the unloader. The motor 52 is then started, whereupon the shaft 56 is driven and rotates the gear wheels 58 meshing with the rack bars 28, whereby the conveying mechanism will move lengthwise of the tracks 27 and through the open car door. As the leading end of the main conveyer 42 enters the car door, the motor 49 is also started and at the same time, the motor 121 is started, so that both the main conveyer and the wing conveyers will commence to operate, even though the wing conveyers are in their nested positions. As the apparatus moves forwardly through the open car door and into the grain, the main conveyer will convey the grain from the car through the door as the machine is moved forwardly into the car. At the same time the wing conveyers, which may still be in the dotted line positions shown at A in Figure 2, may also be operating to feed grain into the main conveyer, so that the apparatus may readily be moved through the car door to the position shown in Figure 1. In some instances, it may be deemed advisable not to operate the wing conveyers until they are swung outwardly into the grain in the car.

When the apparatus has been moved into the car the required distance, the clutch 142 is operated to release the cables 135, and the cables 125 are then operated, whereupon the folded wing conveyer will swing outwardly about their pivots 90, until the inner conveyer sections 65 may come to rest on the grain in the car. As the grain is discharging from the car, the conveyer section 65 will subsequently reach the horizontal position shown in Figure 2, with the outer section 64 positioned thereon, as indicated at D. When the wing conveyers are initially lowered into operative positions with the grain, they may be retained in an inclined position with the outer conveyer sections 64 still folded into parallel relation with the inner conveyer sections 65 until the inner conveyer sections 65 reach substantially a horizontal position. When so positioned, the outer conveyer sections 64 are initially swung outwardly from the position D to substantially the dotted line position, indicated at B in Figure 2, by manipulation of the clutch lever 141. When conveyer section 64 reaches position B, clutch lever 142 is manipulated, whereby the cable 135 will operate plate elements 137 and thereby cause them to swing conveyer section 64 into position C. The cable 125 is then operated by manipulation of the clutch lever 141, thereby to lower the outer conveyer sections 64 into contact with the grain in the car. Conveyer section 64 will eventually reach a horizontal position, when the grain in the car has been removed therefrom, as will readily be understood by reference to Figure 2.

The plate elements 137 thus cooperate with the cables 135 to swing the outer conveyer sections 64 out of parallel relation with the inner conveyer sections 65, as shown by the dotted line positions B and C in Figure 2, after such swinging movement has initially been started by operation of the cable 125. This results because of the bar 138 at the outer ends of the plate elements 137, engaging the outer conveyer section 64 and thereby swinging it upwardly from position B to the vertical position shown at C in Figure 2. It is to be understood that during such outward swinging of the outer conveyer section 64 from position B to position C, the cables 125 may be released. The downward movement of the conveyer sections 64 and 65 is controlled by manipulation of the brakes 139 provided on the clutch shafts 129 and 133.

It is to be understood that the plate elements 137 are so arranged with respect to the foldable wing conveyer section 64, that when said section is folded over and against the inner conveyer section 65, as shown at D in Figure 2, the weight of the conveyer section 64 on the rod 138 of the plate elements 137, will prevent the section 64 from unfolding, when the cables 135 are initially operated to upwardly tilt the folded conveyer sections 64 and 65, whereby the two sections 64 and 65 may be simultaneously folded upwardly to position A. During folding movement of conveyer section 64, from position C to position D, the load is transferred from cables 125 to cables 135, and the latter may then be operated to gradually lower the outer section 64 into folded position D, against section 65. It is to be understood that the weight of the swingable end of section 64 may be carried by rod 138 of plate elements 137, when said section swings inwardly from position C. It will thus be seen that it may require manipulation of both cables 125 and 135 in the operation of unfolding and folding the wing conveyer sections 64 and 65.

By referring to Figures 2 and 11, it will be noted that the guards 81 and 82 at the adjacent ends of the wing conveyer sections 64 and 65, respectively, are provided with means whereby the outer conveyer sections 64, when swung upwardly and inwardly over the inner conveyer section 65, will always be under control. This results because the guards 81 of the outer conveyer sections 64 are provided with peripheral teeth 144, adapted to be received in sockets 145 provided in the peripheries of the adjacent guards 82. The connecting links 66 retain the shafts 67 and 68 in accurately spaced relation, so that the teeth 144 of the outer conveyer sections will register with the sockets 145, in a manner similar to a pair of gears, as will be clearly understood by reference to Figure 2.

The apparatus has been found very practical and efficient in operation. Because of its unique construction, a single operator may conveniently control the operation of the entire apparatus, and unload substantially all of the grain from a car in a comparatively short period of time, with the exception of the usual sweepings remaining around the lower corners of the car. As previously stated, the wing conveyers operate continually, regardless of whether they are folded into compact nested relation, as shown at A in Figure 2, or whether in the positions shown at D, B or C in Figure 2. When all of the grain has been removed from the car, the wing conveyers are folded into upright parallel relation substantially as shown at A in Figure 2, whereby the operator may readily propel the apparatus from the car by manipulation of the controls of the motor 49. Also, because of the unique construction of the wing conveyers, whereby they may be operated regardless of their folded positions, when the apparatus is initially moved into the car, the main conveyor and the upright wing conveyers will engage the grain and move it into the main conveyer so that it may be truly said that the apparatus actually "eats" its way into the grain in the loaded car, after it is moved forwardly thereinto. This is important and economizes in labor in that it does not require that a portion of the contents of the car be initially manually removed therefrom in order to make room in the loaded car for the apparatus, which is more or less common in conventional car unloading apparatus. The apparatus thus requires a minimum of labor and greatly facilitates and simplifies the operation of unloading cars.

I claim as my invention:

1. A car unloader comprising a supporting frame, a main conveyer operatively mounted on said frame, wing conveyers disposed transversely to said main conveyer and each comprising a plurality of hinged together sections adapted to engage and convey grain from the ends of the car to the main conveyer, the sections of each wing conveyers being adapted to be folded into parallel relation, a driving mechanism for the wing conveyers, and means whereby the wing conveyers may be operated regardless of their positions with respect to the main conveyer.

2. A car unloader comprising a supporting frame adapted to be projected through an open car door, a main conveyer on said frame for discharging grain from the car through the car door, oppositely disposed wing conveyers adapted to convey grain from the ends of the car to the main conveyer, each wing conveyer comprising a plurality of transversely disposed flights adapted to move over the surface of the car floor to convey the grain to the main conveyer, a plurality of thin bars secured to each wing conveyer and cooperating to form tracks or guides for the flights of said wing conveyers to prevent said flights from directly engaging the car floor, and means for simultaneously driving the main conveyer and said wing conveyers.

3. A car unloader comprising a conveyer supporting frame having means for projecting it through an open car door, a main conveyer on said frame for discharging grain from the car through its open door, oppositely disposed wing conveyers operatively associated with the main conveyer and adapted to deliver grain thereto from the ends of the car, each of said wing conveyers comprising pivotally connected sections adapted to be folded into parallel relation in a horizontal position, means whereby each wing conveyer, when its sections are folded into parallel relation, may be folded into a vertical position on the supporting frame to facilitate transporting the apparatus, and means for driving said wing conveyers regardless of their positions with respect to the main conveyer.

4. A car unloader comprising a conveyer supporting frame, an operator's station, a main conveyer supported on said frame, oppositely disposed wing conveyers adapted to be extended into the ends of a car to convey grain therefrom to the main conveyer, each wing conveyer comprising inner and outer sections pivotally connected together and having a driving connection therebetween, each inner conveyer section having inwardly extending arms pivoted to the supporting frame, whereby the wing conveyers, when the sections thereof are folded into parallel relation, may be folded to positions within the confines of the supporting frame to facilitate transporting the apparatus, means pivoted to the inner section of each wing conveyer for outwardly swinging the outer section thereof, said pivoted means comprising a pair of plate elements, one pivoted to each side of each inner section, and the plate elements of each pair of said elements having means at their outer ends for engaging the outer sections to swing them into extended positions, and means at the operator's station for controlling the operation of said elements.

5. A car unloader comprising a conveyer supporting frame, an operator's station, a main conveyer supported on said frame, oppositely disposed wing conveyers adapted to be extended into the ends of a car to convey grain therefrom to the main conveyer, each wing conveyer comprising inner and outer sections pivotally connected together and having a driving connection therebetween, each inner conveyer section having inwardly extending arms pivoted to the lower portion of the supporting frame, whereby the wing conveyers, when the sections thereof are folded into parallel relation, may be folded to positions within the confines of the supporting frame to facilitate transporting the apparatus, a pair of plate elements pivoted to the inner section of each wing conveyer for outwardly swinging the outer section thereof, said elements having means at their outer ends for engaging the outer sections to swing them into extended positions, cables connected to said plate elements and to the outer sections of each wing conveyer and having running connections with suitable drums, clutches for operating said drums, and means at the operator's station for controlling the operation of said clutches and whereby the pivotal movement of the wing conveyers may be conveniently controlled.

6. In an apparatus of the class described, a conveyer frame comprising a plurality of conveyers and equipped with suitable carrying wheels, an auxiliary frame having tracks thereon upon which said wheels may travel, a fixed support for the auxiliary frame having means thereon for vertically adjusting the auxiliary frame to aline the wheels of the conveyer frame with the floor of a box car, and means on the conveyer frame for bridging the gap between the tracks on the auxiliary frame, and the floor of the box car, whereby the conveyer frame may readily be moved into or out of the car.

7. In an apparatus of the class described, a frame comprising a main conveyer and a plurality of sectional wing conveyers disposed at right angles to the main conveyer, the sections of each wing conveyer being adapted to be folded upon themselves into parallel relation, and said wing conveyer also being adapted to be folded into upright positions to permit the apparatus to pass through a car door, means for extending the wing conveyers into the ends of a car to convey grain therefrom to the main conveyer, means for supporting the conveyer frame adjacent to a grain car, said means comprising a fixed support having an auxiliary frame mounted thereon upon which the conveyer supporting frame is mounted for traveling movement, means for vertically adjusting the auxiliary frame upon the fixed support, thereby to aline the conveyer supporting frame with the floor of the car, and means secured to the front end of the conveyer supporting frame for guiding the front end of said frame into the car.

8. In an apparatus of the class described, a frame comprising a main conveyer and a plurality of wing conveyers disposed at right angles to the main conveyer, means for extending the wing conveyers into the ends of a car to convey grain therefrom to the main conveyer, means for supporting the conveyer supporting frame in inoperative position exteriorly of the car, said means comprising a fixed support having an auxiliary frame mounted thereon upon which the conveyer supporting frame is mounted for traveling movement, means for vertically adjusting the auxiliary frame upon the fixed support, thereby to aline the conveyer frame with the floor of the car, and a shoe secured to the front end of the conveyer supporting frame adapted to engage a roller mounted on the auxiliary frame, said shoe and roller cooperating to bridge the gap between the auxiliary frame and the floor of the car, when moving the conveyer supporting frame into or out of the car.

CHRISTIAN JENSEN.